Figure 1:
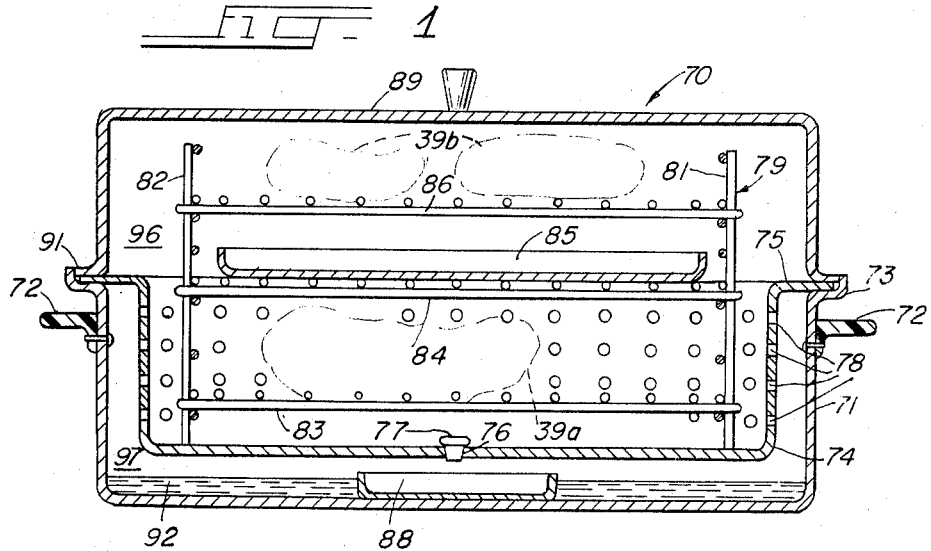

Dec. 6, 1966  A. J. LEWUS  3,289,571
COOKING APPARATUS
Original Filed April 5, 1963

INVENTOR
ALEXANDER J. LEWUS
BY Wallace, Kinzer & Dorn
ATTY.

3,289,571
COOKING APPARATUS
Alexander J. Lewus, Cicero, Ill.
Original application Apr. 5, 1963, Ser. No. 270,840, now Patent No. 3,212,426, dated Oct. 19, 1965. Divided and this application July 7, 1965, Ser. No. 470,050
5 Claims. (Cl. 99—339)

This application is a division of application Serial No. 270,840, filed April 5, 1963 now Patent No. 3,212,426, issued October 19, 1965.

This invention relates to a new and improved apparatus for cooking meat, vegetables and other food items to afford maximum preservation of nutritional values and at the same time to afford superior taste qualities in the cooked food.

Two of the basic cooking processes, usually considered to be substantially incompatible with each other, may be broadly described as dry cooking and wet cooking. In dry cooking, such as baking, broiling, or the like, the natural juices of the food being cooked are frequently evaporated and lost, with a resultant reduction in nutritional values and in vitamin content. In addition, the food may be rather dry and tough when cooking is completed, particularly with respect to meats. In wet cooking processes, on the other hand, where a substantial quantity of water is introduced in the course of the cooking procedure, a substantial loss of flavor and in nutritional value may be occasioned by excess moisture leaching out the food.

It is a principal object of the present invention to afford a new and improved apparatus for cooking food, in an oven, that is effective to retain the natural moisture in the food and to avoid loss of flavor and nutritional values either by excessive evaporation or by introduction of excessive moisture into the cooking process.

A specific object of the invention is to provide a new and improved roaster cooking apparatus that first cooks the food in a dry condition and subsequently introduces a limited quantity of moisture, in the form of steam or super-heated steam, to maintain the desired moisture content in the cooked food.

It is a particular object of the invention to afford a new and improved dry- and wet-cooking apparatus for oven use that does not require introduction of water into the cooking chamber at any intermediate stage in the cooking process, or any other manipulation of the food once cooking has started.

Another object of the invention is to provide a new and improved roaster apparatus for cooking a variety of different foods within the same chamber, simultaneously, without substantial interchange of flavors between the foods.

Another object of the invention is to achieve the major benefits and advantages of pressure cooking without subjecting the food being cooked to saturation by steam, the food being at least partially dry cooked before cooking under relatively low pressure is initiated.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

Figure 2:
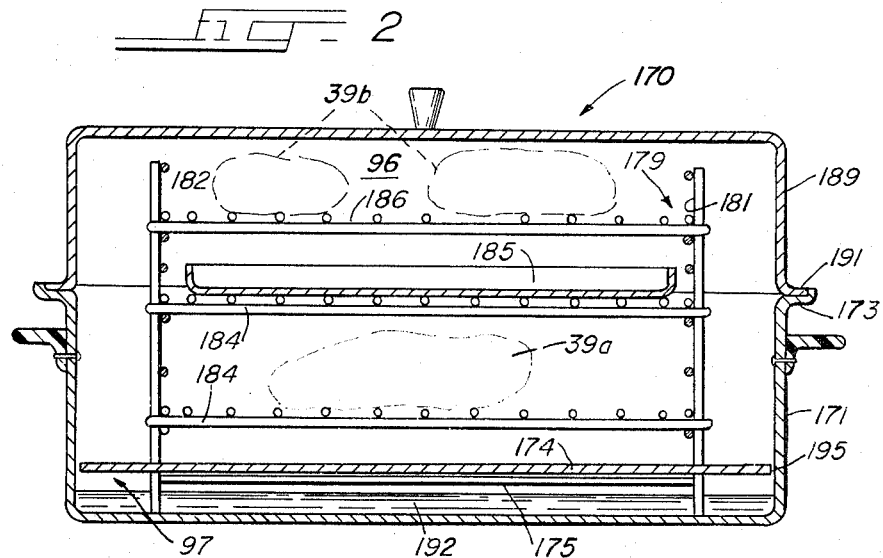

In the drawings:

FIG. 1 is a sectional elevation view of cooking apparatus constructed in accordance with one embodiment of the present invention; and FIG. 2 is a sectional elevation view of another form of the cooking apparatus.

FIG. 1 illustrates a cooking apparatus 70 intended for use in a pre-heated oven and constituting a preferred embodiment of the present invention. Cooking apparatus 70 includes a base member 71 that constitutes the main support member for the apparatus. Base member 71 may be essentially similar to the bottom half of a conventional roaster and may be provided with a pair of handles 72. The upper rim of base member 71 is formed in a flange 73, and a deep-walled barrier pan 74 is mounted upon flange 73 by means of a rim 75 of the pan. The bottom of pan 74 is of solid, imperforate construction except for a small central opening 76 closed with a plug 77. The side walls of pan 74, which are quite deep, are provided with a plurality of openings 78 to afford limited communication between a cooking chamber 96 above pan 74 and a moisture chamber 97 below the pan.

An open wire or bar rack structure 79 is mounted within and is supported by pan 74. Rack structure 79 includes two vertically extending multiple bar racks 81 and 82 rigidly connected to a bottom grill 83 that is a fixed part of the rack structure. The bottom grill 83 is utilized to support a roast or other food 39A to be cooked in apparatus 70.

A second support grill 84 is mounted upon rack 79, extending between the vertical legs 81 and 82 of the rack. A drip pan 85 is mounted upon grill 84. Above grill 84, another grill 86 is mounted between the two vertical legs of rack 79. This additional grill supports further food items 39B to be cooked in the apparatus. Preferably, grills 84 and 86 are removably mounted in the rack structure.

In the bottom chamber 97 of cooking apparatus 70, a small gravy collection pan 88 may be mounted immediately below the single opening 76 in the bottom of pan 74.

The cover member 89 of cooking apparatus 70 is substantially similar to the top cover of a conventional roaster. The cover is provided with a supporting flange 91 that is seated in the flange 73 of the base member 71 of the apparatus. As seen in the drawing, the flanges on base member 71, barrier pan 74, and cover member 89 all interfit with each other.

When cooking apparatus 70 is to be placed in use, a small quantity of water 92 is introduced into the moisture chamber 97 comprising the lower portion of the roasting pan, base member 71, affording a limited reservoir of moisture within the roaster. The barrier pan 74 is then mounted in place, as shown in FIG. 1, and the main portion of the rack structure 79 is positioned within pan 74. The lower portion 39A of the food to be cooked is disposed in its cooking position on grill 83. Grill 84 is then placed in the rack structure and pan 85 is positioned on the grill, after which the upper grill 86 is mounted in place on the rack structure and the remaining food 39B is positioned for cooking. It will be recognized that the food 39A and 39B, the two removable racks 84 and 86, and the pan 85 may be mounted in rack structure 79 before the rack structure is placed in pan 74. Cover 89 is then positioned on the apparatus, totally enclosing chamber 96, and the apparatus is placed in a preheated oven for cooking.

When the cooking apparatus 70 is first placed in the oven, the air within chamber 96 is heated by conduction through the members 71 and 89 of the apparatus that enclose the unvented space constituting chambers 96 and 97. Consequently, the food 39A and 39B is first heated in dry condition before any substantial quantity of water 92 can be evaporated. Subsequently, water 92 is evaporated and moisture passes through the limited openings 78 in pan 74 and circulates through cooking chamber 96 to contact the food. Only a very limited quantity of water is used. Moreover, the restrictive circulation between the water in the bottom of pan 71 and the foods, suspended well above the water and enclosed by pan 74, limits the amount of moisture received at any given time by the foods. It is important to note that the imperforate bottom wall of pan 74 greatly restricts the flow of steam to the food; access is provided only by the side wall apertures 78 around the periphery of the barrier pan.

Pan 85 prevent condensed moisture from food 39B from falling into contact with the lower food 39A. This pan also prevents the return of drippings to the initial water reservoir in the bottom of the support member pan 71. The drippings or food juices from food 39A are captured in the base of pan 74, which thus functions as a drip pan. After cooking is completed, this pan may be conveniently drained into the small gravy pan 88, by removing plug 76, so that the drippings may be retained for making gravy or other purposes.

In a given application, using cooking apparatus 70, it may be desirable to prepare a roast, which would usually be mounted in the position indicated by phantom outline 39A, and at the same time to cook vegetables to be served with the roast, the vegetables being located at positions 39B. On the other hand, it may be desirable to prepare a stew, in which case the meat and vegetables to be prepared with it are disposed in a pan within cooking chamber 96. The circulating moisture from chamber 97 to the cooking foods is adequate to prepare a dry stew, without leaching out the flavor and nutritional values of the stewed foods. In the use of the cooking apparatus 70 of FIG. 1, the plug 76 and pan 88 may also be omitted, at the time the food is placed in the cooker, to permit moisture condensing in cooking chamber 96 to return to the initial supply 92 in moisture chamber 97 if desired. However, it is most undesirable to provide any more than a small aperture for this purpose; any substantial variation in the essentially imperforate construction of the bottom of pan 74 allows too much moisture into the cooking chamber above the pan.

FIG. 2 is a sectional elevation view of a cooking apparatus 170 constructed in accordance with another embodiment of the present invention. The cooking apparatus 170 includes a base member 171 essenitally similar to the bottom portion of a conventional roasting pan and constituting the principal support member for the apparatus. The upper rim of base member 171 comprises a relatively wide flange 173. A cover member 189 fits over base member 171. Cover member 189 is provided with a flange 191 that fits into the base member flange 173, so that the members 171 and 189 enclose a space within which the food may be cooked.

An open wire or bar rack structure 179 is mounted within the enclosure defined by base member 171 and cover member 189 and rests upon the bottom of the base member. Rack structure 179 includes two vertically extending multiple-bar racks 181 and 182 bridged by an imperforate stainless steel plate 174 located near the bottom of the two vertical rack members. Plate 174 may be welded or otherwise appropriately fixed to the two vertical racks. Alternatively, the plate may be removably mounted on the racks, in which instance a lower support bar or bars 175 may be utilized to join the two vertical racks.

Above plate 174, there are three grills 183, 184 and 186 removably mounted in the rack structure 179 and extending between the two vertical racks 181 and 182. The lower grill 183 supports a roast or other food 39A to be cooked in the apparatus 170. The intermediate grill 184 supports a drip pan 185. The upper grill 186 supports additional food items 39B.

The imperforate plate 174 extends outwardly of rack structure 179 so that only a quite limited space 195 is available around the edges of the plate. Thus, plate 175 effectively divides the enclosed space within cooking apparatus 170 into an upper cooking chamber 196 and a lower moisture chamber 197. Plate 174, like pan 74 in the previous embodiment, is located low enough within the enclosure so that only a quite small supply of water 192 can be incorporated in the moisture chamber 197 below the plate.

In use, cooking apparatus 170 is assembled as illustrated in FIG. 2, with the food in place, and is positioned within a heated oven, receiving heat from all sides as indicated by the arrows. Initially, the air within the cooking apparatus, and particularly within the upper heating chamber 196, is heated by conduction through the base and cover members 171 and 189. Consequently, the food 39A and 39B within the unvented enclosed chamber of the cooker is first heated in dry condition before any substantial quantity of the water 192 is evaporated. As the cooker heats up, the water supply 192 is evaporated and moisture passes through the limited passageway 195 around plate 175 and circulates by convection into cooking chamber 196 and into contact with the food.

The restrictive circulation between the water supply 192 in the bottom of base member 171 and the foods, which are suspended well above the water and separated from the water by plate 174, effectively limits the amount of moisture received at any given time by the food. The drip pan 185 prevents condensed moisture from the upper layer of food 39B from falling into contact with the lower food 39A. Some of the drippings from food 39A may reach the water supply 192 but, for the most part, these will merely collect on the plate 174. It is thus seen that cooking apparatus 170 functions in much the same manner as the previously described embodiment constituting cooker 70.

In relation to both embodiments, the external configuration of the cooking apparatus is not particularly important. Thus, the cookers may be of circular cross-sectional configuration or may be of oval shape as is frequently used in connection with roaster pans. In both embodiments, however, it is important that the barrier member between the moisture chamber and the cooking chamber be so constructed as to afford only quite limited access between the two chambers to avoid excessive and premature moist cooking of the food.

Hence, while preferred embodiments of the invention have been described and illustrated, it is to be understood that they are capable of variation and modification.

I claim:
1. A roaster apparatus for cooking meat, vegetables, and other food items within an oven comprising:
    enclosure means, comprising a base member and a cover member loosely resting on said base member, defining a closed, unvented chamber having a low height in relation to its width and having minimal pressure-retention capability, adapted to be heated from all sides simultaneously in an oven;
    a moisture barrier, removably mounted in said enclosure means and closing off the lower portion of said chamber from the upper portion, said lower portion constituting a moisture chamber for holding a limited supply of water and said upper chamber constituting a cooking chamber;

the bottom of said barrier being substantially completely imperforate to prevent direct upward flow of steam from said moisture chamber into said cooking chamber, a limited peripheral portion only of said barrier pan affording a limited opening between said chambers to permit circulation of a limited supply of steam to said cooking chamber;

and support means, removably mounted within said base member and extending above said barrier into said cooking chamber, for supporting food items in elevated cooking position within said cooking chamber in position to be cooked by convection currents of dry air and moist air within said cooking chamber, said support means constituting a bar rack open on all sides to permit the flow of convection currents of dry heated air and of said limited supply of steam all around the food.

2. A roaster apparatus for cooking meat, vegetables, and other food items, within an oven, comprising:

enclosure means, comprising a base member and a cover member loosely resting on said base member, defining a closed, unvented chamber having a low height in relation to its width and having minimal pressure-retention capability, adapted to be heated from all sides simultaneously in an oven;

a barrier pan, removably mounted in said enclosure means and closing off the lower portion of said chamber from the upper portion, said lower portion constituting a moisture chamber for holding a limited supply of water and said upper chamber constituting a cooking chamber;

the bottom of said barrier pan being substantially completely imperforate to prevent direct upward flow of steam from said moisture chamber into said cooking chamber, a limited peripheral portion only of said barrier pan affording a limited opening between said chambers to permit circulation of a limited supply of steam to said cooking chamber;

and support means, removably mounted on said barrier pan, for supporting food items in elevated cooking position within said cooking chamber in position to be cooked by convection currents of dry air and moist air within said cooking chamber, said support means constituting a bar rack open on all sides to permit the flow of convection currents of dry heated air and of said limited supply of steam all around the food.

3. A roaster apparatus for cooking meat, vegetables, and other food items, with an oven, comprising:

enclosure means, comprising a base member and a cover member loosely resting on said base member, defining a closed, unvented chamber having a low height in relation to its width and having minimal pressure-retention capability, adapted to be heated from all sides simultaneously in an oven;

a deep-walled barrier pan, removably mounted in said enclosure means and closing off the lower portion of said chamber from the upper portion, said lower portion constituting a moisture chamber for holding a limited supply of water and said upper chamber constituting a cooking chamber;

the bottom of said barrier pan being substantially completely imperforate to prevent direct upward flow of steam from said moisture chamber into said cooking chamber, the side walls of said barrier pan having a plurality of apertures therein to permit circulation of a limited supply of steam to said cooking chamber;

and support means, removably mounted on said barrier pan, for supporting food items in elevated cooking position within said cooking chamber in position to be cooked by convection currents of dry air and moist air within said cooking chamber, said support means constituting bar rack open on all sides to permit the flow of convection currents of dry heated air and of said limited supply of steam all around the food.

4. A roaster apparatus for cooking meat, vegetables, and other food items, within an oven, comprising:

enclosure means, comprising a base member and a cover member having interfitting engageable peripheral flanges, said cover member resting loosely on said base member, defining a closed, unvented chamber of low height in relation to its width and having minimal pressure-retention capability, adapted to be heated from an encompassing external heat source such as an oven;

a deep barrier pan, removably mounted in said enclosure means by means of a peripheral flange engaging said base member and cover flanges and closing off the lower portion of said chamber from the upper portion, said lower portion constituting a moisture chamber for holding a limited supply of water and said upper chamber constituting a cooking chamber;

the bottom of said barrier pan being substantially completely imperforate to prevent direct upward flow of steam from said moisture chamber into said cooking chamber but having a single drain opening for draining off condensed food juices, the side walls of said barrier pan having a plurality of apertures therein to permit circulation of a limited supply of steam to said cooking chamber;

removable plug means for closing said drain opening;

a food juice collection pan removably disposed in said base member beneath said drain opening, for collecting food juices;

and support means, removably mounted on said barrier pan, for supporting food items in elevated cooking position within said cooking chamber in position to be cooked by convection currents of dry air and moist air within said cooking chamber, said support means constituting a bar rack open on all sides to permit the flow of convection currents of dry heated air and of said limited supply of steam all around the food.

5. A roaster apparatus for cooking meat, vegetables, and other food items, within an oven, comprising:

enclosure means, comprising a base member and a cover member loosely resting on said base member, defining a closed, unvented chamber having a low height in relation to its width and having minimal pressure-retention capability, adapted to be heated from all sides simultaneously in an oven;

a flat barrier plate, disposed within said enclosure means and closing off the lower portion of said chamber from the upper portion, said lower portion constituting a moisture chamber for holding a limited supply of water and said upper chamber constituting a cooking chamber;

the bottom of said barrier plate being imperforate to prevent direct upward flow of steam from said moisture chamber into said cooking chamber, the side edges of said barrier plate terminating just short of the base member walls to permit circulation of only a limited supply of steam to said cooking chamber;

and support means, removably mounted on the bottom of said base member, for supporting food items in elevated cooking position within said cooking chamber in position to be cooked by convection currents of dry air and moist air within said cooking chamber, said support means constituting a bar rack open on all sides to permit the flow of convection currents of dry heated air and of said limited supply of steam all around the food;

said barrier plate being mounted on the lower part of said support means.

(References on following page)

References Cited by the Examiner

UNITED STATES PATENTS

| | | | |
|---|---|---|---|
| 77,702 | 5/1868 | Zopff | 99—446 |
| 84,194 | 11/1868 | Kasson | 99—446 |
| 346,334 | 7/1886 | Watkins | 99—446 |
| 918,656 | 4/1909 | Chase | 126—369 |
| 1,060,500 | 4/1913 | Salmon | 99—339 |
| 1,740,205 | 12/1929 | Schmidt | 99—446 |
| 1,820,325 | 8/1931 | Rage. | |
| 1,837,924 | 12/1931 | Rutherford | 99—260 |
| 2,024,259 | 12/1935 | Troeber et al. | |
| 2,915,001 | 12/1959 | Montgomery | 99—339 |
| 3,109,359 | 11/1963 | Falla | 99—339 |
| 3,130,288 | 4/1964 | Monaco et al. | 126—369 X |

FOREIGN PATENTS

| | | |
|---|---|---|
| 271,878 | 3/1914 | Germany. |
| 661,453 | 11/1951 | Great Britain |

WALTER A. SCHEEL, *Primary Examiner.*

S. P. FISHER, *Assistant Examiner.*